(12) United States Patent
Tanizawa et al.

(10) Patent No.: US 6,511,396 B1
(45) Date of Patent: Jan. 28, 2003

(54) OIL TEMPERATURE ADJUSTING APPARATUS IN HYDRAULICALLY OPERATED TRANSMISSION

(75) Inventors: Shoichi Tanizawa, Saitama (JP); Masatoshi Tanioka, Saitama (JP); Masayuki Tsumagari, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 158 days.

(21) Appl. No.: 09/625,723

(22) Filed: Jul. 26, 2000

(30) Foreign Application Priority Data

Sep. 10, 1999 (JP) ............................................. 11-257295

(51) Int. Cl.⁷ ............................ F16H 57/04; F01P 1/06
(52) U.S. Cl. ........................ 475/161; 123/41.31; 165/51
(58) Field of Search ....................... 475/161; 123/41.31; 165/41, 42, 47, 51, 65, 140

(56) References Cited

U.S. PATENT DOCUMENTS

| 2,926,737 | A | * | 3/1960 | Fischer .................... 475/161 X |
| 3,016,769 | A | * | 1/1962 | Christenson et al. ... 475/161 X |
| 4,010,660 | A | * | 3/1977 | Ahlen ..................... 475/161 X |
| 4,535,729 | A | * | 8/1985 | Faylor .................. 123/41.31 X |
| 4,922,996 | A | * | 5/1990 | Rees ......................... 165/47 X |
| 5,125,368 | A | * | 6/1992 | Tzavaras ................. 123/41.31 |
| 5,443,114 | A | * | 8/1995 | Deary .......................... 165/41 |
| 5,558,154 | A | * | 9/1996 | Lefeber ........................ 165/51 |
| 5,730,089 | A | * | 3/1998 | Morikawa et al. ... 123/41.33 X |
| 5,752,655 | A | * | 5/1998 | Kodama et al. ....... 237/12.3 B |
| 5,996,762 | A | * | 12/1999 | Edelmann et al. ... 123/41.31 X |
| 6,068,569 | A | * | 5/2000 | Redinger et al. ...... 475/161 X |
| 6,178,928 | B1 | * | 1/2001 | Corriveau ............... 123/41.12 |
| 6,202,736 | B1 | * | 3/2001 | Fast ............................ 165/51 |

FOREIGN PATENT DOCUMENTS

| JP | 7-259971 | 10/1995 |
| JP | 8-247263 | 9/1996 |
| JP | 11-264318 | 9/1999 |

* cited by examiner

Primary Examiner—Charles A. Marmor
Assistant Examiner—Roger Pang
(74) Attorney, Agent, or Firm—Arent Fox Kintner Plotkin & Kahn

(57) ABSTRACT

A heat exchanger 15 is disposed in an oil passage 14 provided in a hydraulic pressure circuit 9 of a hydraulically operated transmission, to conduct heat exchange between cooling water for an engine 2 and hydraulic fluid.

7 Claims, 4 Drawing Sheets

OIL TEMPERATURE ADJUSTING APPARATUS IN HYDRAULICALLY OPERATED TRANSMISSION

BACKGROUND OF THE INVENTION

1. Field of the Invention

The present invention relates to an oil temperature adjusting apparatus which is applied mainly to a hydraulically operated transmission for a vehicle.

2. Description of the Related Art

The hydraulically operated transmission for the vehicle is composed of a fluid torque converter adapted to be connected to an engine and a sub transmission including hydraulic clutches for gear shifts and mounted on an output side of the fluid torque converter. The fluid torque converter is provided with a lock-up clutch which is adapted to be pushed toward a side of engagement by hydraulic pressure in its inner gap and pushed toward a side of release by hydraulic pressure in a back pressure chamber. The lock-up clutch is so constructed as to be engaged either in a direct coupling condition or in a slipping condition, by controlling a differential pressure between the hydraulic pressure in the inner gap and the hydraulic pressure in the back pressure chamber.

In this structure, when the lock-up clutch is engaged in the slipping condition, oil temperature of hydraulic fluid will rise with friction heat. Conventionally, the temperature of the hydraulic fluid in the transmission has been prevented from rising, by returning the oil drained from the fluid torque converter into a transmission case through a radiating pipe arranged on a rear face of a radiator.

By the way, as the oil temperature of the hydraulic fluid in the transmission becomes low, a friction loss of the transmission will become large due to an increase of viscosity of the hydraulic fluid, and fuel efficiency in the engine will be deteriorated. However, a conventional attention has been paid only to prevention of the temperature rise of the hydraulic fluid, and accordingly, when the temperature of the outside air has become low, the temperature rise of the hydraulic fluid has been deferred, which has caused a bad influence on the fuel efficiency.

SUMMARY OF THE INVENTION

In view of the above, it is an object of the invention to provide an oil temperature adjusting apparatus in a hydraulically operated transmission in which the temperature rise of the hydraulic fluid in cold weather can be accelerated and the fuel efficiency can be improved.

In order to solve the above described problem, there is provided according to the invention, an apparatus for adjusting oil temperature of hydraulic fluid in a hydraulically operated transmission which is adapted to be connected to an engine, wherein the apparatus includes a heat exchanger for conducting heat exchange between the hydraulic fluid and cooling water for the engine.

Temperature of the cooling water for the engine will rise in an early stage after the engine has started, and the temperature rise of the hydraulic fluid will be accelerated by conducting the heat exchange with the cooling water. Thus, even in the cold weather, the temperature of the hydraulic fluid will be raised in an early stage and the friction loss in the transmission will be reduced, so that the fuel efficiency can be enhanced.

Moreover, when the oil temperature of the hydraulic fluid has become over a determined level, the cooling water for the engine acts as a cooling medium to cool the hydraulic fluid, thus preventing the hydraulic fluid from being overheated.

DETAILED DESCRIPTION OF THE PREFERRED EMBODIMENTS

Figure 1:
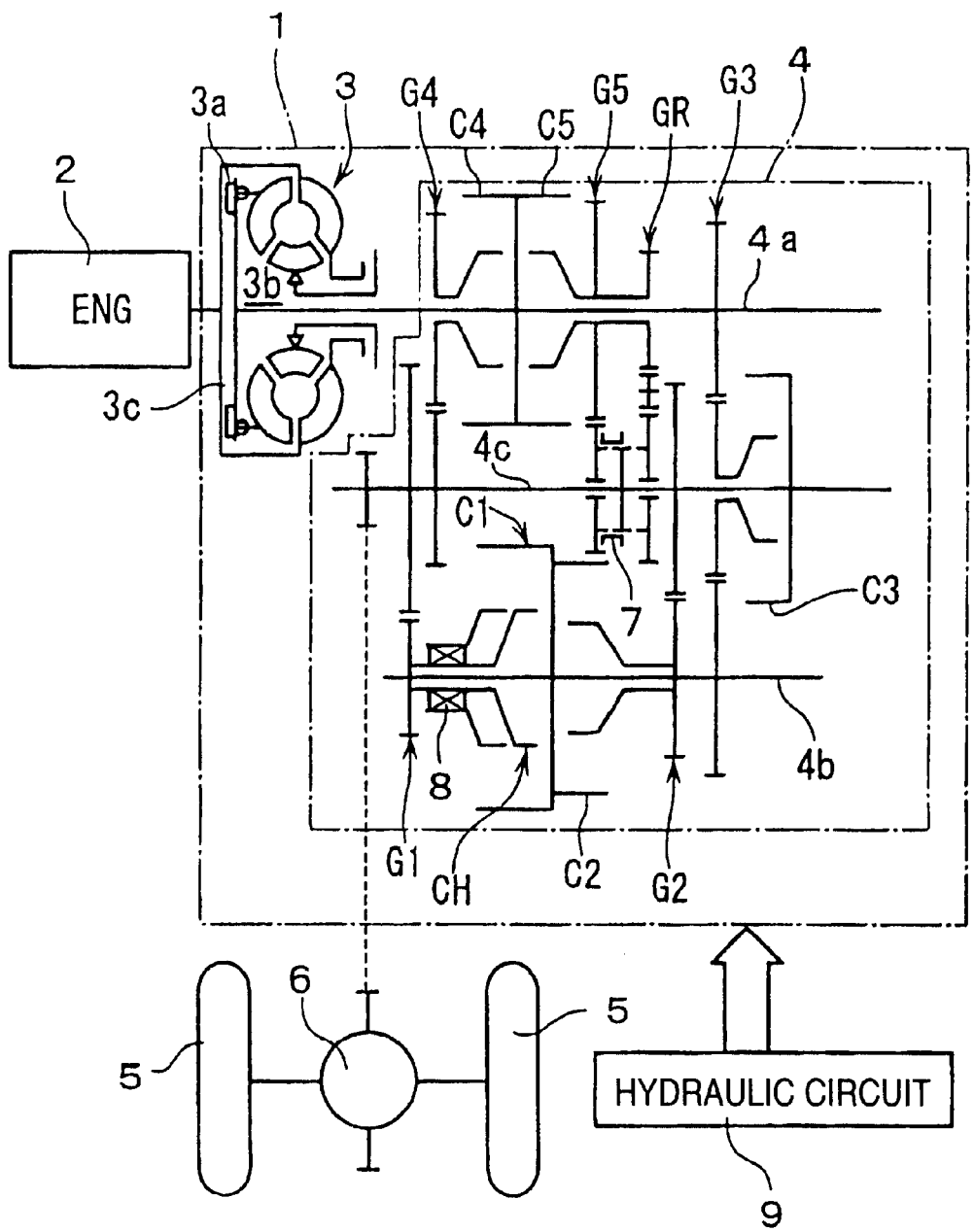
FIG. 1 is a skeleton diagram of an example of a hydraulically operated transmission to which the present invention is applied.

Referring to FIG. 1, reference numeral 1 designates a hydraulically operated transmission for a vehicle. The transmission 1 is composed of a fluid torque converter 3 connected to an engine 2, and a sub transmission 4 mounted on an output side of the fluid torque converter 3.

The sub transmission 4 includes a first input shaft 4a connected to the fluid torque converter 3, a second input shaft 4b synchronously rotating with the first input shaft 4a, and an output shaft 4c connected to driving wheels 5 of the vehicle by way of a differential gear 6. First and second speed gear stages G1 and G2 for forward movement are juxtaposed between the second input shaft 4b and the output shaft 4c. Third to fifth speed gear stages G3, G4 and G5 for forward movement and a reverse gear stage GR are juxtaposed between the first input shaft 4a and the output shaft 4c. First to fifth speed hydraulic clutches C1, C2, C3, C4, and CS which are hydraulic connecting elements are respectively provided on these gear stages for the forward movements so that the respective gear stages for the forward movements can be selectively established through the connection of the respective hydraulic clutches. The reverse gear stage GR and the fifth speed gear stage G5 commonly use the fifth speed clutch C5. The fifth speed gear stage GR and the reverse gear stage G5 are selectively established by switching a selector gear 7 on the output shaft 4c into a side of the forward movement on the left hand in FIG. 1 and into a side of the backward movement on the right hand. The second input shaft 4b is connected to a gear train for the third speed gear stage G3 provided on the output shaft 4c at an input side of the third speed hydraulic clutch C3 by means of a gear to conduct the synchronous rotation with the first input shaft 4a.

The first speed gear stage G1 is provided with a one way clutch 8 between the first speed hydraulic clutch C1 and a gear train for the first speed gear stage G1 at its output side in order to allow an over rotation of the output side. Further, a first speed holding hydraulic clutch CH which is connected at its output side to the gear train for the first speed gear stage G1 is incorporated in the first speed hydraulic clutch C1, so that the first speed gear stage G1 can be established through an engagement of the hydraulic clutch CH in a condition where the over rotation of the output side is not allowed, that is, the condition where an engine brake can be applied.

In the fluid torque converter 3, there is incorporated a lock-up clutch 3a which is adapted to be engaged with an end wall portion of a converter case to perform a coupling between the input side and the output side of the fluid torque converter 3. The lock-up clutch 3a is so constructed as to be pushed toward a side of engagement by hydraulic pressure in an inner gap 3b in the fluid torque converter 3, and pushed toward a side of release by hydraulic pressure in a back pressure chamber 3c which is defined between the end wall portion of the converter case and the lock-up clutch 3a.

Figure 2:
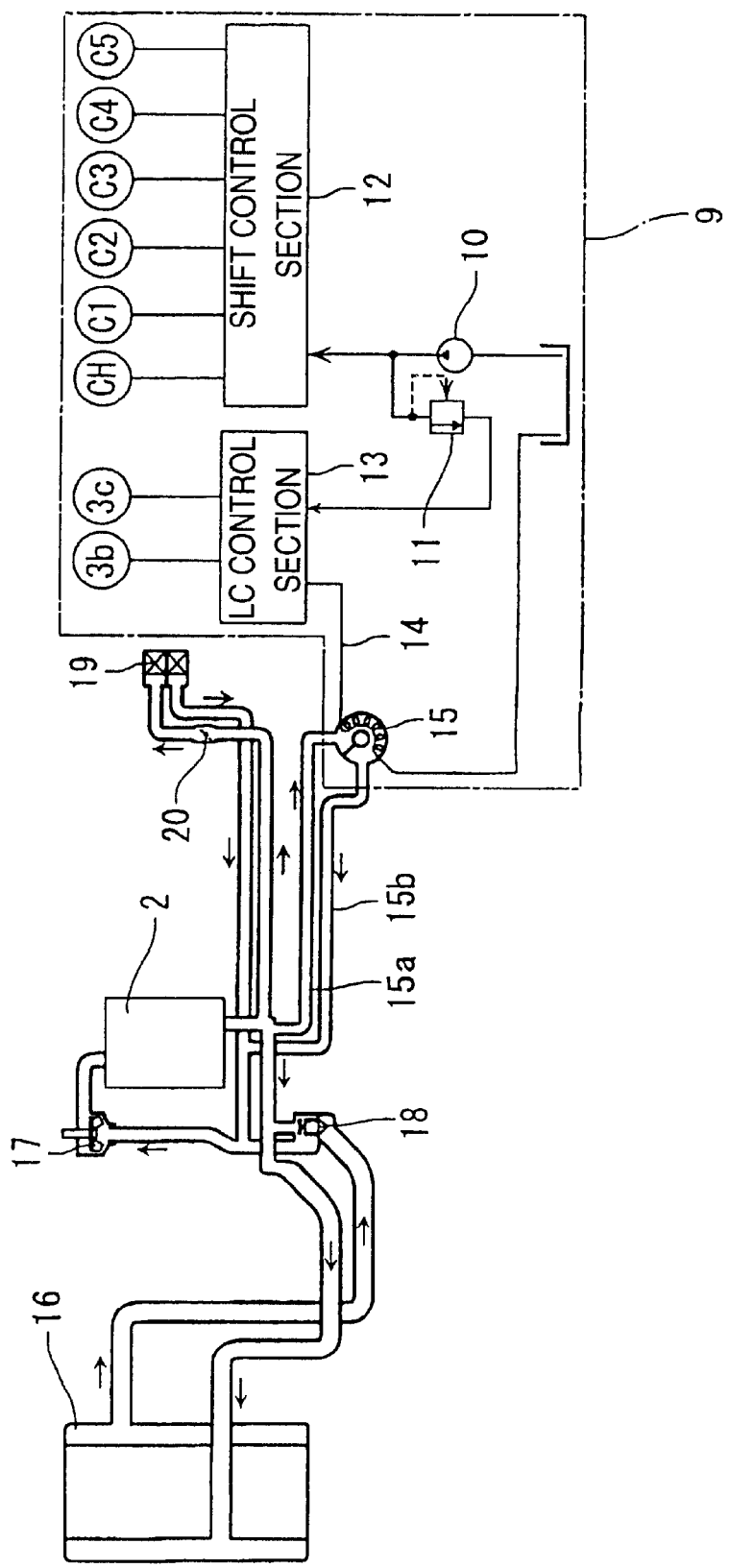
FIG. 2 is a view showing a cooling water circuit for an engine and a hydraulic pressure circuit in the transmission.

The hydraulically operated transmission 1 further includes a hydraulic pressure circuit 9 incorporated therein. As shown in FIG. 2, the hydraulic pressure circuit 9 is composed of a hydraulic fluid pump 10 for sucking up the hydraulic fluid in the transmission case, a regulator 11 for adjusting a discharge pressure from the hydraulic fluid pump 10 to a determined line pressure, a shift control section 12 for supplying the hydraulic fluid adjusted to the line pressure, and a control section 13 for the lock-up clutch 3a (hereinafter referred to as an LC control section) for supplying the hydraulic fluid leaked from the regulator 11. The shift control section 12 is so constructed as to control the oil supplied to and discharged from the respective hydraulic clutches CH, C1, C2, C3, C4 and CS in the sub transmission 4 thereby to conduct gear shifts of the sub transmission 4. The LC control section 13 is so constructed as to control the oil supplied to and discharged from the inner gap 3b and the back pressure chamber 3c in the fluid torque converter 3 thereby to engage and release the lock-up clutch 3a. Further, the differential pressure between the hydraulic pressure in the inner gap 3b and the hydraulic pressure in the back pressure chamber 3c is controlled thereby to engage the lock-up clutch 3a either in the direct coupling condition or in the slipping condition. The shift control section 12 and the LC control section are conventionally known, and detailed description of them will be omitted.

To the LC control section 13, there is connected a drain oil passage 14 for returning the hydraulic fluid drained from the fluid torque converter 3 to the transmission case. A heat exchanger 15 is provided in the drain oil passage 14 in order to conduct heat exchange between the hydraulic fluid and the cooling water for the engine.

Hereunder, the heat exchanger 15 will be described including a cooling water circuit for the engine 2. The cooling water circuit is so constructed that the cooling water is forcibly circulated between the engine 2 and a radiator 16 by means of a water pump 17, and that the cooling water is circulated bypassing the radiator 16 by means of a thermostat 18 at a low temperature of the water. There is further provided a circuit for an air conditioning heater 19 so that when a heater valve 20 provided in the circuit is opened, a portion of the cooling water flowed out from the engine 2 is returned to the water pump 17 through the air conditioning heater 19. A circuit for the heat exchanger 15 is provided in parallel with the circuit for the air conditioning heater 19 so that a portion of the cooling water flowed out from the engine 2 is returned to the water pump 17 through the heat exchanger 15.

Figure 3:
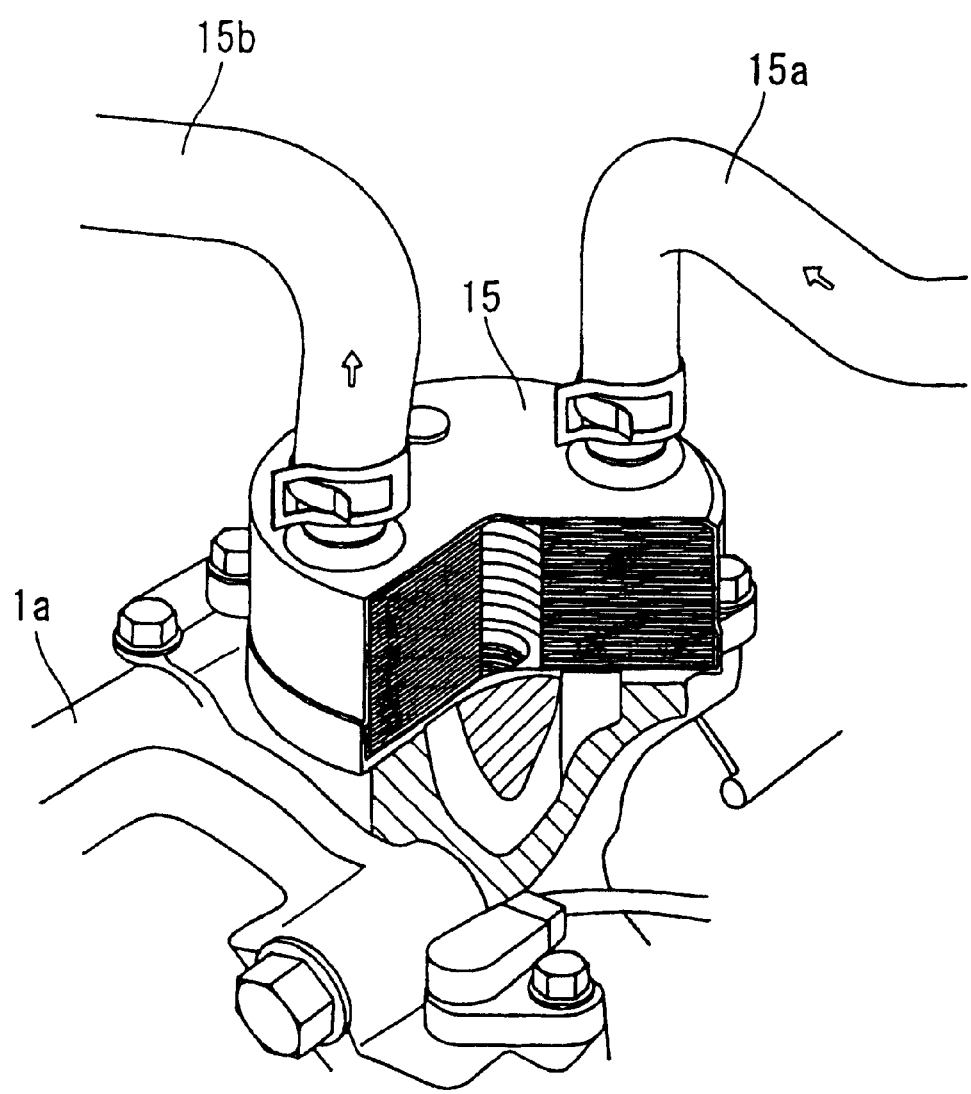
FIG. 3 is a perspective view of a heat exchanger with a portion cut away.

The heat exchanger 15 is of a same structure as an oil cooler which is used for cooling an engine oil, and mounted on the transmission case 1a as shown in FIG. 3. The reference numerals 15a and 15b in the drawing designate an inlet hose and an outlet hose for the cooling water, respectively.

Figure 4:
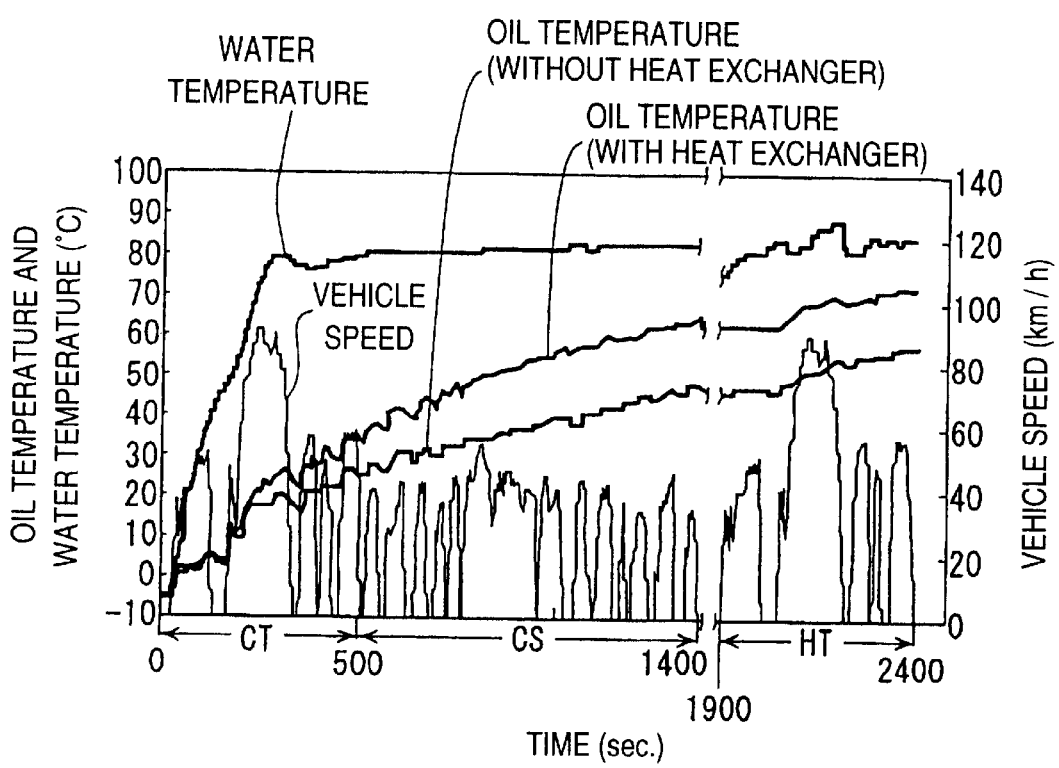
FIG. 4 is a graph showing changes in water temperature of the cooling water and changes in oil temperature of the hydraulic fluid.

FIG. 4 shows changes in the water temperature of the cooling water, changes in the oil temperature of the hydraulic fluid in the transmission 1, and changes in vehicle speed when a car is driving in a driving mode which is called as Los Angeles fourth mode when the temperature of the outside air is −6.7° C. In this case, driving in a phase called as CT (Cold Transient) for 500 sec. after the engine has started, driving in a phase called as CS (Cold Stability) for 900 sec., and driving in a phase called as HT (Hot Transient) for 500 sec. after next 10 minutes have passed are conducted. As apparent from FIG. 4, by providing the heat exchanger 15 as in this embodiment, the hydraulic fluid will be heated up through the heat exchange with the cooling water which rapidly rises after the engine has started, and the rise of the temperature of the hydraulic fluid will be accelerated as compared with the case where the heat exchanger 15 is not provided. When the lock-up clutch 3a is engaged in the slipping condition, the hydraulic fluid is heated up to almost 170° C. by the friction heat in some cases. However, the cooling water will be maintained below about 90° C., and so, the heated hydraulic fluid will be cooled down by the heat exchanger 15 and the temperature of the oil will not extraordinarily rise.

Further, as shown in FIG. 2, since the circuit for the heat exchanger 15 is provided side by side with the circuit for the air conditioning heater 19, and the heater valve 20 is disposed on the circuit for the air conditioning heater 19, the temperature of the hydraulic fluid can be controlled to be not more than a predetermined value.

Figure 5:
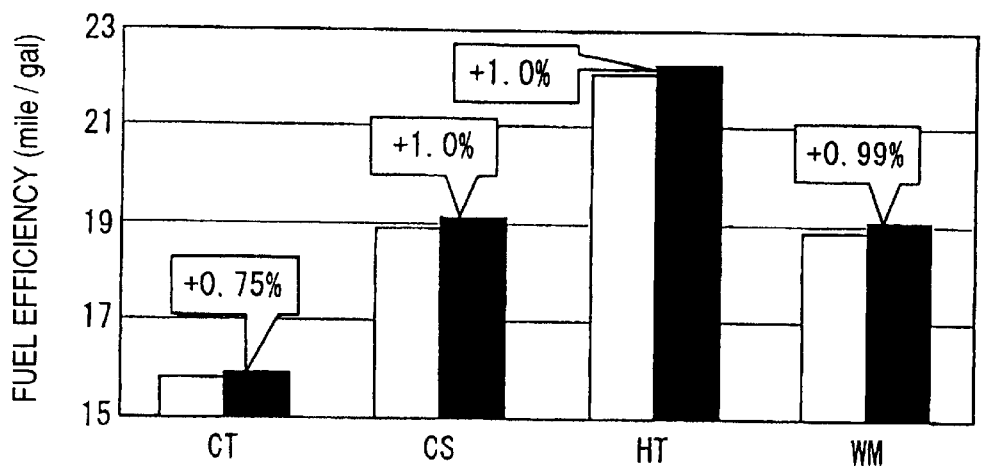
FIG. 5 is a graph showing fuel efficiency.

FIG. 5 shows a fuel efficiency (driving distance (mile) per one gallon) in the respective phases above described, in which black columns represent those cases where the heat exchanger 15 is provided and blank columns represent those cases where the heat exchanger 15 is not provided. It was found that by providing the heat exchanger 15, the fuel efficiency has been enhanced by 0.75% in the CT phase, 1.0% in the CS phase, and 0.98% in the HT phase, and the fuel efficiency of weighted average WM (weight mass) has been improved by 0.99%.

In the above described embodiment, the heat exchanger 15 is provided in the drain passage 14 from the LC control section 13. However, it is a matter of course that the heat exchanger 15 may be provided in other parts of the hydraulic pressure circuit 9.

As apparent from the foregoing description, the rise of the temperature of the hydraulic fluid in the cold weather can be accelerated according to the invention, and the friction loss in the transmission can be reduced, thereby improving the fuel efficiency. Further, by the control of the heat valve 20, the temperature of the hydraulic fluid can be controlled to be not more than a predetermined value, whereby a simple structure without another pump or a valve mechanism can be obtained.

While only certain embodiments of the invention have been specifically described herein, it will apparent that numerous modifications may be made thereto, without departing from the spirit and scope of the invention.

The present disclosure relates to the subject matter contained in Japanese patent application No. Hei.11-257295 filed on Sep. 10, 1999 which is expressly incorporated herein by reference in its entirety.

What is claimed is:

1. An apparatus connected to a heat exchanger and an air conditioning heater for adjusting oil temperature of hydraulic fluid in a hydraulically operated transmission connected to an engine, comprising:
   a first cooling water flowing, circuit for the heat exchanger;
   a second cooling water flowing circuit for the air conditioning heater, wherein the first and second cooling water flowing circuits share a common branch portion;
   a third cooling water flowing circuit in communication with the engine, extending from the common branch portion and connected to the first and second circuits in parallel; and a heat valve is located in a downstream side of the second circuit, wherein a portion of cooling water from the engine flows through the first circuit and the common branch portion to the heat exchanger, and returns to a cooling system of the engine, and another portion of cooling, water from the engine flowing through the second circuit and the common branch portion to the air conditioning heater, and returning to the cooling system of the engine.

2. The apparatus according to claim 1, wherein said heat exchanger is mounted on a case of said transmission.

3. The apparatus according to claim 1, wherein said heat exchanger is arranged in a drain passage from a control section controlling a lock-up clutch by hydraulic fluid.

4. The apparatus according to claim 1, wherein the cooling water for said engine circulating through said heat exchanger bypasses radiator through a thermostat.

5. The apparatus according to claim 1, wherein at least a portion of the cooling water for said engine circulates within the air conditioning heater through the heater valve.

6. A hydraulically operated transmission connected to an engine, comprising:
- a sub-transmission having a plurality of hydraulic clutches;
- a torque converter having a lock-up clutch;
- a shift control section controlling said hydraulic clutches by hydraulic fluid;
- a lock-up clutch control section controlling said lock-up clutch by the hydraulic fluid; and
- a hydraulic circuit supplying the hydraulic fluid to said shift control section and said lock-up clutch control section, and
- a heat exchange system arranged on a hydraulic circuit for conducting heat exchanged between the hydraulic fluid and cooling water for said engine; the heat exchanger system comprising:
- a heat exchange;
- a first cooling water flowing circuit for the heat exchanger;
- an air conditioning heater;
- a second cooling water flowing circuit for the air conditioning heater, wherein the first and second cooling water flowing circuits share a common branch portion;
- a third cooling water flowing circuit in communication with the engine, extending from the common branch portion and connected to the first and second circuits in parallel; and
- a heat valve is located in a downstream side of the second circuit, wherein portion of cooling water from the engine flows through the first circuit and the common branch portion to the heat exchanger, and returns to a cooling system of the engine, and another portion of cooling water from the engine flowing through the second circuit and the common branch portion to the air conditioning heater, and returning to the cooling system of the engine.

7. The hydraulic operated transmission according to claim 6, wherein said heat exchanger conducts the heat exchange between the hydraulic fluid drained from said lock-up clutch control section and the cooling water for said engine.

* * * * *